United States Patent
Mo

(10) Patent No.: US 12,033,144 B2
(45) Date of Patent: Jul. 9, 2024

(54) SYSTEMS AND METHODS FOR IMPROVED INDEXING OF NON-STANDARDIZED, CUSTOM SMART CONTRACTS

(71) Applicant: Coinbase, Inc., San Francisco, CA (US)

(72) Inventor: Alex George Mo, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 246 days.

(21) Appl. No.: 17/665,276

(22) Filed: Feb. 4, 2022

(65) Prior Publication Data

US 2023/0252462 A1 Aug. 10, 2023

(51) Int. Cl.
*G06Q 20/38* (2012.01)

(52) U.S. Cl.
CPC ... *G06Q 20/3827* (2013.01); *G06Q 20/38215* (2013.01); *G06Q 20/3825* (2013.01); *G06Q 20/389* (2013.01)

(58) Field of Classification Search
CPC ......... G06Q 20/3827; G06Q 20/38215; G06Q 20/3825; G06Q 20/389
USPC .................................. 717/131–141
See application file for complete search history.

(56) References Cited

U.S. PATENT DOCUMENTS

| | | | | |
|---|---|---|---|---|
| 8,776,013 B2* | 7/2014 | Riehl | ................ | G06F 9/45516 717/146 |
| 8,924,942 B1* | 12/2014 | Makuch | ................ | G06F 3/00 717/125 |
| 9,038,032 B2* | 5/2015 | Li | ................ | G06F 11/3684 717/124 |
| 10,540,654 B1* | 1/2020 | James | ................ | G06Q 20/223 |
| 10,789,376 B2* | 9/2020 | Yan | ................ | H04L 9/3239 |
| 11,398,911 B1* | 7/2022 | Gunning | ................ | G07F 17/0014 |
| 11,477,005 B1* | 10/2022 | Lupowitz | ................ | H04L 9/3213 |
| 11,501,297 B1* | 11/2022 | Tai | ................ | G06Q 20/02 |

(Continued)

OTHER PUBLICATIONS

Abdelhamid et al, "Blockchain and Smart Contracts," ACM, pp. 91-95 (Year: 2019).*

(Continued)

*Primary Examiner* — Anil Khatri
(74) *Attorney, Agent, or Firm* — Foley & Lardner LLP

(57) ABSTRACT

Methods and systems for improved indexing of non-standardized, custom smart contracts. The improved indexer identifies custom landmarks (e.g., portions of bytecode indicative of custom smart contract transactions or particular functions in those transactions) that are indicative of transactions involving custom smart contracts (as well as the various attributes of those custom smart contracts). The indexer does this by first collecting bytecode for a subset of known transactions involving the custom smart contracts. The indexer then compares the bytecode of the custom smart contracts in the subset to identify the landmarks or probabilities that portions of the bytecode correspond to landmarks. Once these landmarks are identified (or a probability of the landmark is above a certain threshold), the indexer may designate these as known landmarks. The indexer may then compare the portion of the bytecode corresponding to the known landmark to raw bytecode. Upon detecting a match (or a probability of a match above a certain threshold), the indexer may identify the transaction and/or attributes of the transaction.

18 Claims, 6 Drawing Sheets

(56) References Cited

U.S. PATENT DOCUMENTS

| | | | |
|---|---|---|---|
| 11,616,650 B1* | 3/2023 | Panjwani | H04L 9/3247 |
| | | | 713/168 |
| 11,734,758 B2* | 8/2023 | Henson | G06Q 40/04 |
| | | | 705/37 |
| 11,865,459 B1* | 1/2024 | Leondires | A63F 13/792 |
| 11,880,434 B1* | 1/2024 | Richter | G06F 21/602 |
| 11,883,749 B1* | 1/2024 | Leondires | A63F 13/71 |
| 11,900,373 B2* | 2/2024 | Tai | G06Q 20/20 |
| 2021/0165890 A1* | 6/2021 | Schvey | G06F 21/6218 |

OTHER PUBLICATIONS

Wang et al, "Blockchain-Enabled Smart Contracts: Architecture, Applications, and Future Trends", IEEE, pp. 2266-2277 (Year: 2019).*

Yang et al, "Non-Fungible Tokens (NFTs): tokens of digital assets on the blockchain", ACM, pp. 175-182 (Year: 2023).*

Ikebe et al, "Application and Limitations of Digital Signature Schemes for Implementing Non-Fungible Token (NFT)", ACM, pp. 119-125 (Year: 2023).*

Tran et al, "Advanced Environmental Monitoring Solution Using the Internet of Things (IoT) and Blockchain", ACM, pp. 1-5 (Year: 2020).*

Madhwal et al, "Blockchain Extension for PostgreSQL Data Storage", ACM, pp. 70-75 (Year: 2021).*

* cited by examiner

SYSTEMS AND METHODS FOR IMPROVED INDEXING OF NON-STANDARDIZED, CUSTOM SMART CONTRACTS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology, specifically as it relates to non-fungible tokens. A non-fungible token may comprise a token that is associated with a good, a service, a smart contract, and/or other content that may be verified by, and stored using, blockchain technology. As one example, methods and systems are described herein for improved indexing of non-fungible tokens.

As transactions involving non-fungible tokens continues to expand, the need for indexing these transactions continues to increase. However, a problem with indexing them is that not all non-fungible tokens follow a standardized contract protocol. These non-standard or "custom smart contracts" create a problem for indexing as the non-standardization means that there is no current mechanism for parsing the bytecode to identify the transactions as well as identify attributes (e.g., parameters, events, etc.) about the transactions. This problem is further exacerbated as the contract code of many of these custom smart contracts is not publicly verifiable on the blockchain and other avenues for obtaining the contract code (e.g., websites, public databases, etc.) may be out-of-date, incomplete, and/or include errors. Accordingly, conventional indexers not only lack a means of identifying transactions for custom contracts in a reliable manner, but also lack a means of identifying attributes (e.g., parameters, events, etc.) in identified transactions.

In view of these technical problems, a method of improved indexing of non-standardized, custom smart contracts is described. In particular, the improved indexing does not rely on publicly available contract code to parse a blockchain for new transactions. Instead, the improved indexer identifies custom landmarks (e.g., portions of bytecode indicative of custom smart contract transactions or particular functions in those transactions) that are indicative of transactions involving custom smart contracts (as well as the various attributes of those custom smart contracts). The method does this by first collecting bytecode for a subset of known transactions involving the custom smart contracts. The method then compares the bytecode of the custom smart contracts in the subset to identify the landmarks or probabilities that portions of the bytecode correspond to landmarks. Once these landmarks are identified (or a probability of the landmark is above a certain threshold), the method may designate these as known landmarks. The method may then compare the portion of the bytecode corresponding to the known landmark to raw bytecode. Upon detecting a match (or a probability of a match above a certain threshold), the method may identify the transaction and/or attributes of the transaction. Once identified, the method may proceed to index the transactions and/or attributes.

In some aspects, methods and systems for improved indexing of non-standardized, custom smart contracts based on known landmarks in blockchain bytecode are described. For example, the system may retrieve, from a blockchain node, a first bytecode sample for a first blockchain operation. The system may retrieve a known bytecode token-type landmark for a first non-standardized non-fungible token. The system may parse the first bytecode sample for the known bytecode token-type landmark. The system may determine that a portion of the first bytecode sample corresponds to the known bytecode token-type landmark. The system may, in response to determining that the portion of the first bytecode sample corresponds to the known bytecode token-type landmark, determine that the first blockchain operation corresponds to the first non-standardized non-fungible token. The system may, in response to determining that the first blockchain operation corresponds to the first non-standardized non-fungible token, generating a first index record in a blockchain index for the first non-standardized non-fungible token, wherein the first index record corresponds to the first blockchain operation.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
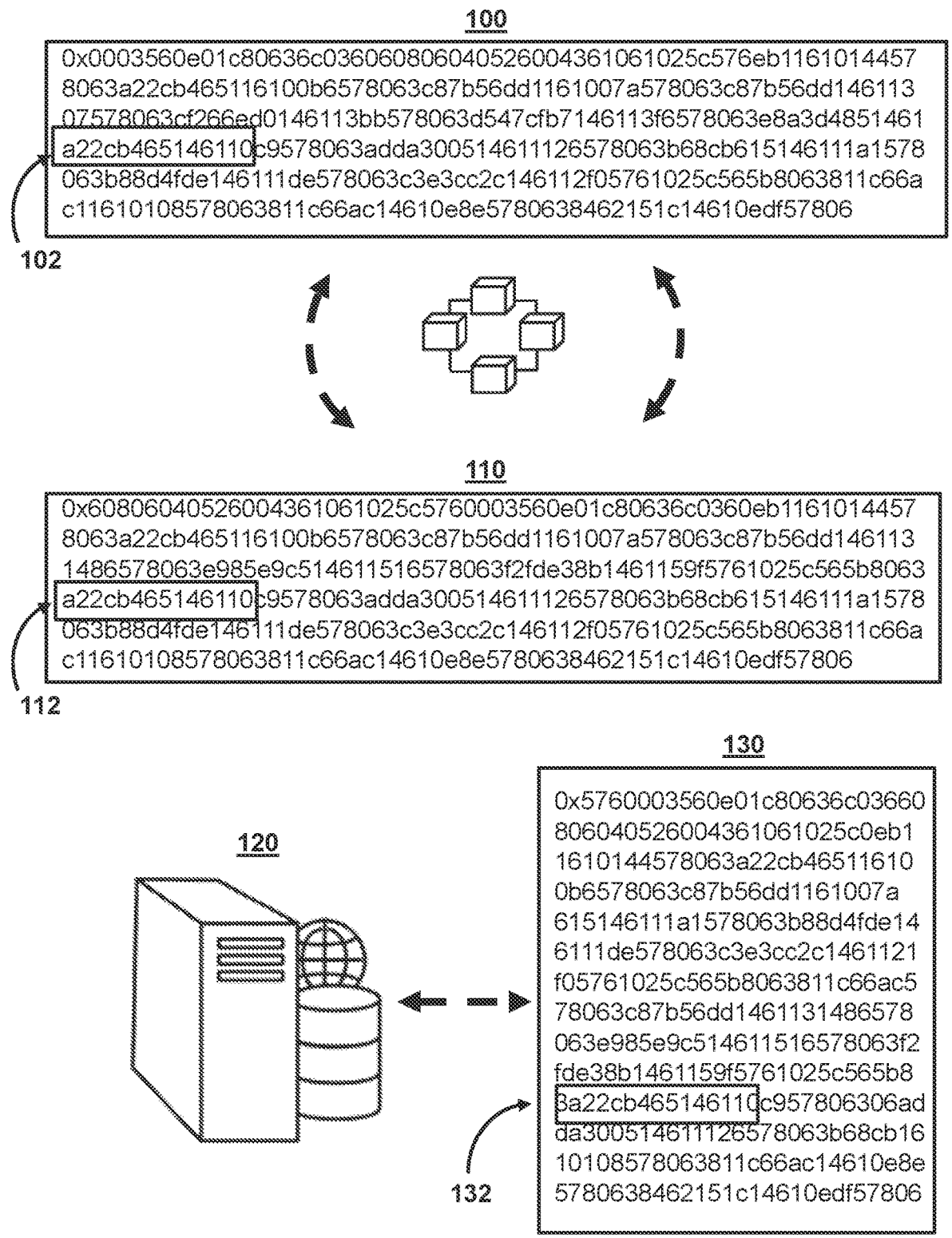
FIG. 1 shows an illustrative diagram for improved indexing of non-standardized, custom smart contracts, in accordance with one or more embodiments.

FIG. 1 shows an illustrative diagram for improved indexing of non-standardized, custom smart contracts, in accordance with one or more embodiments. For example, FIG. 1 illustrates how landmarks (e.g., detected in known blockchain operations for a non-fungible token) may be used to detect a type of a non-fungible token in a new blockchain operation.

For example, as shown in FIG. 1, the system may retrieve, from the blockchain node, bytecode sample 100. For example, bytecode sample 100 may correspond to a previous blockchain operation known to correspond to a non-standardized non-fungible token and/or a function of that non-standardized non-fungible token. Within bytecode sample 100, the system may detect portion 102. Additionally, the system may retrieve, from the blockchain node, bytecode sample 110. For example, bytecode sample 110 may correspond to another previous blockchain operation known to correspond to the same non-standardized non-fungible token and/or a function of that non-standardized non-fungible token. Within bytecode sample 110, the system may detect portion 112. For example, the system may detect that portion 102 and portion 112 correspond. Based on these portions corresponding the system may designate the portion as a landmark (e.g., a portion of bytecode that identifies and/or provides an indication of a source, function, and/or non-fungible token type).

Upon detecting the landmark, an indexer (e.g., indexer 120) may parse raw bytecode (e.g., raw bytecode 130) for a portion that corresponds to the landmark. In response to detecting a portion (e.g., portion 132) that corresponds to the landmark, the system may identify a source, function, and/or non-fungible token type.

For example, the system may detect a landmark based on detecting an exact match (e.g., a matching text string sequence), a probability of a match, and/or a portion of the bytecode has a threshold similarity. For example, the system may determine that the portion of a first bytecode sample (e.g., raw bytecode 130) corresponds to the known bytecode token-type landmark (e.g., portion 112). Additionally or alternatively, the system may determine a probability that the portion (e.g., portion 132) of the first bytecode sample (e.g., raw bytecode 130) corresponds to the known bytecode token-type landmark (e.g., portion 112). The system may then compare the probability to a threshold probability to determine whether the probability equals or exceeds the threshold probability. If so, the system may determine that the raw bytecode corresponds to the known bytecode token-type landmark.

In some embodiments, parsing the first bytecode sample for the known bytecode token-type landmark may further comprise retrieving a similarity metric (e.g., a qualitative and/or quantitative measurement of the similarity between two portions). The system may then determine whether portions of the first bytecode sample correspond to the known bytecode token-type landmark based on the similarity metric. The system may use various algorithms for determining a similarity metric. For example, the system may use edit distance-based algorithms that compute the number of operations needed to transform one string to another. For example, as the number of operations increases, the lower the similarity metric between the two strings. The system may further modify the importance of a given index character (e.g., based on the non-fungible token and/or characters determined to be of key importance).

Additionally or alternatively, the system may use a token-based algorithm where the expected input is a set of tokens, rather than complete strings. The system may find the similar tokens in both sets. As the number of the number of common tokens increase, the higher the similarity between the sets. For example, a string may be transformed into sets by splitting using a delimiter, which can transform a sentence into tokens of words or n-grams characters. The system may further modify the importance of a given index character (e.g., based on the non-fungible token and/or characters determined to be of key importance).

Additionally or alternatively, the system may use a sequence-based algorithm where the similarity is a factor of common sub-strings between the two strings. The system may find the longest sequence which is present in both strings, the more of these sequences found, the higher the similarity metric. The system may further modify the importance of a combination with a given index character and/or combination of characters of same length (e.g., based on the non-fungible token and/or characters determined to be of key importance).

Additionally, the system may determine a first similarity metric factor based on the first non-standardized non-fungible token and determine a second similarity metric factor based on the known bytecode token-type landmark. The system may then determine a similarity metric based on the first similarity metric factor and the second similarity metric factor. For example, a similarity metric factor may be any characteristic that distinguishes one factor from another. For example, a similarity metric factor may comprise a weight or importance of a character, text length, combination of characteristics, and/or combination of text strings.

In some embodiments, the system may use machine learning and/or artificial intelligence models to detect landmarks, determine similarity metrics, and/or detect landmarks in bytecode samples. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

For example, the system may use a machine learning model that takes inputs (e.g., a known portion, raw bytecode sample, etc.) and provide outputs (e.g., an identification, probability, similarity metric related to a source, function, and/or non-fungible token type). The inputs may include multiple data sets such as a training data set and a test data set. In some embodiments, outputs may be fed back into a machine learning model as inputs to train the machine learning model (e.g., alone or in conjunction with user indications of the accuracy of the outputs, labels associated with the inputs, or other reference feedback information). In another embodiment, the machine learning model may update its configurations (e.g., weights, biases, or other parameters) based on the assessment of its prediction (e.g., an identification, probability, similarity metric related to a source, function, and/or non-fungible token type) and reference feedback information (e.g., user indication of accuracy, reference labels, or other information). In another embodiment, where the machine learning model is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model may be trained to generate better predictions.

In some embodiments, the machine learning model may include an artificial neural network. In such embodiments, the machine learning model may include an input layer and one or more hidden layers. Each neural unit of the machine learning model may be connected with many other neural units of the machine learning model. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function that the signal must surpass before it propagates to other neural units. The machine learning model may be self-learning and trained, rather than explicitly programmed, and can perform significantly better in certain areas of problem solving, as compared to traditional computer programs. During training, an output layer of the machine learning model may correspond to a classification of the machine learning model and an input known to correspond to that classification may be input into an input layer of the machine learning model during training. During testing, an input without a known classification (e.g., a known non-fungible token type and/or function) may be input into the input layer, and a determined classification may be output.

In some embodiments, the machine learning model may include multiple layers (e.g., where a signal path traverses from front layers to back layers). In some embodiments, backpropagation techniques may be utilized by the machine learning model where forward stimulation is used to reset weights on the "front" neural units. In some embodiments, stimulation and inhibition for the machine learning model may be more free-flowing, with connections interacting in a more chaotic and complex fashion. During testing, an output layer of the machine learning model may indicate whether a given input corresponds to a classification of the machine learning model (e.g., a known non-fungible token type and/or function).

Figure 2:
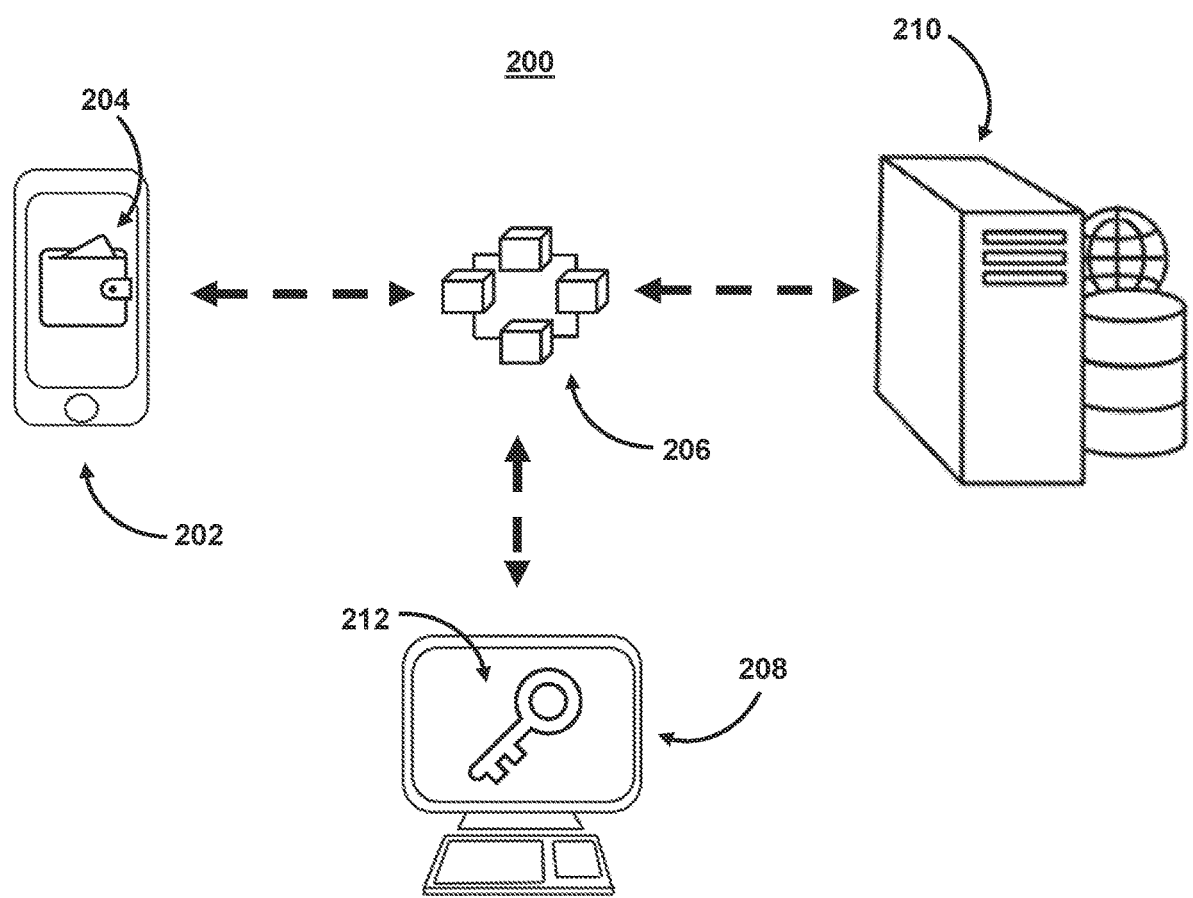
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to improve indexing, in some embodiments. FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to improve indexing, and the user interface may display content related to improved indexing. As referred to herein, "content" should be understood to mean an electronically consumable user asset, representations of goods or services (including non-fungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to improve indexing. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related non-fungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a non-fungible token. A non-fungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain operations such as improve indexing. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
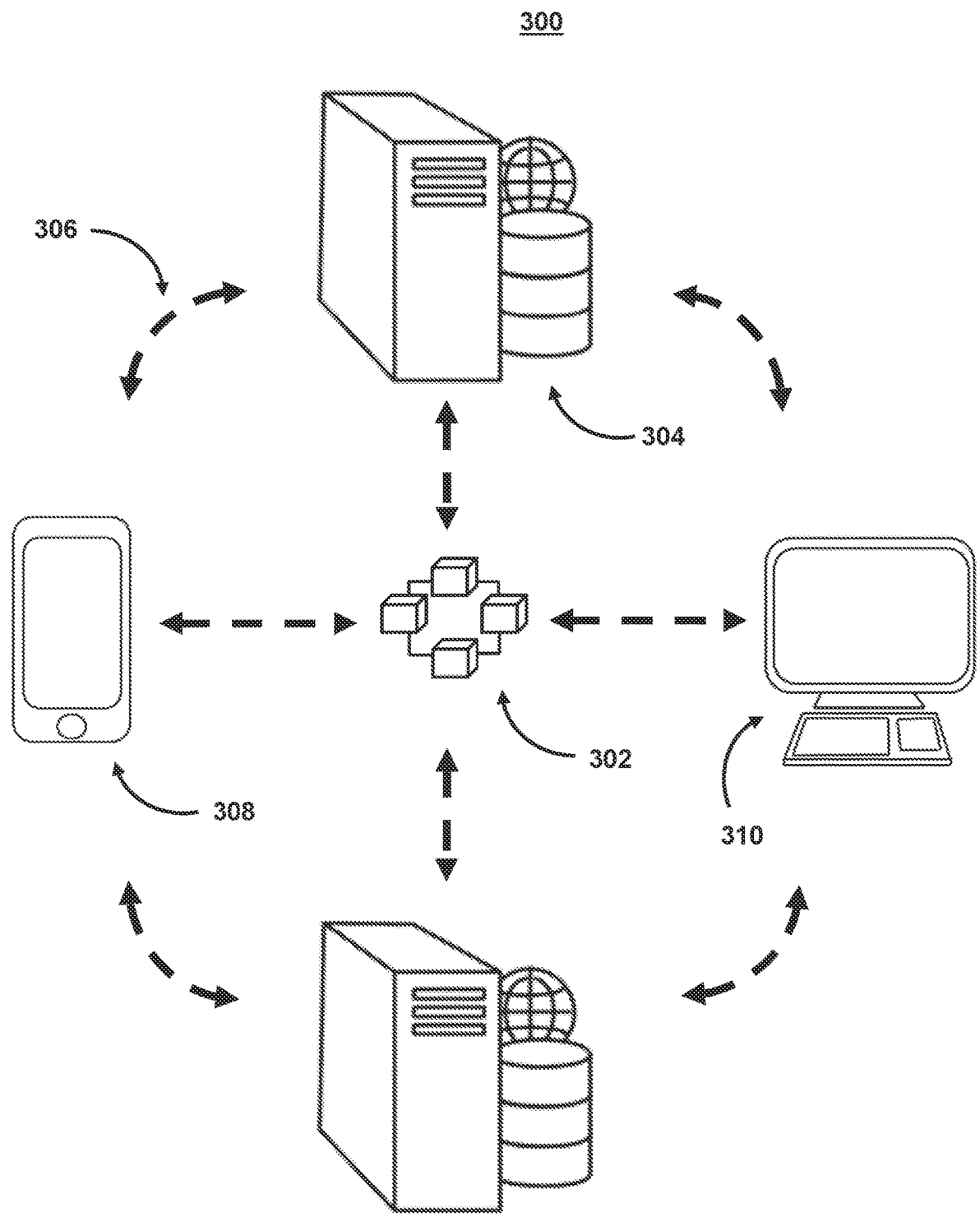
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may improve indexing within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to improved indexing within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
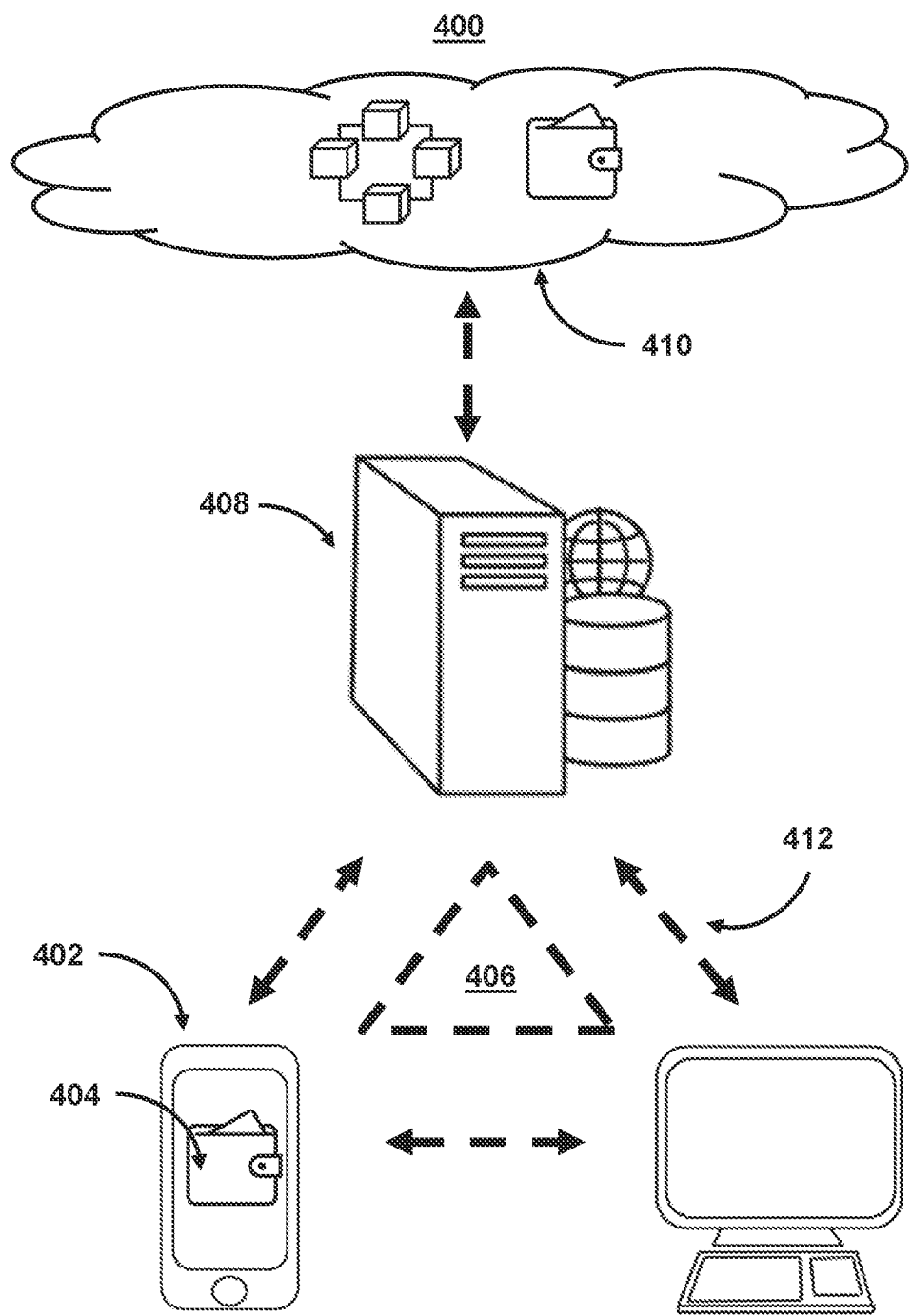
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to improve indexing. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate improved indexing. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insultation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, doing translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding is may be automated by the system using compilers or wallets interacting with the blockchain.

Figure 5:
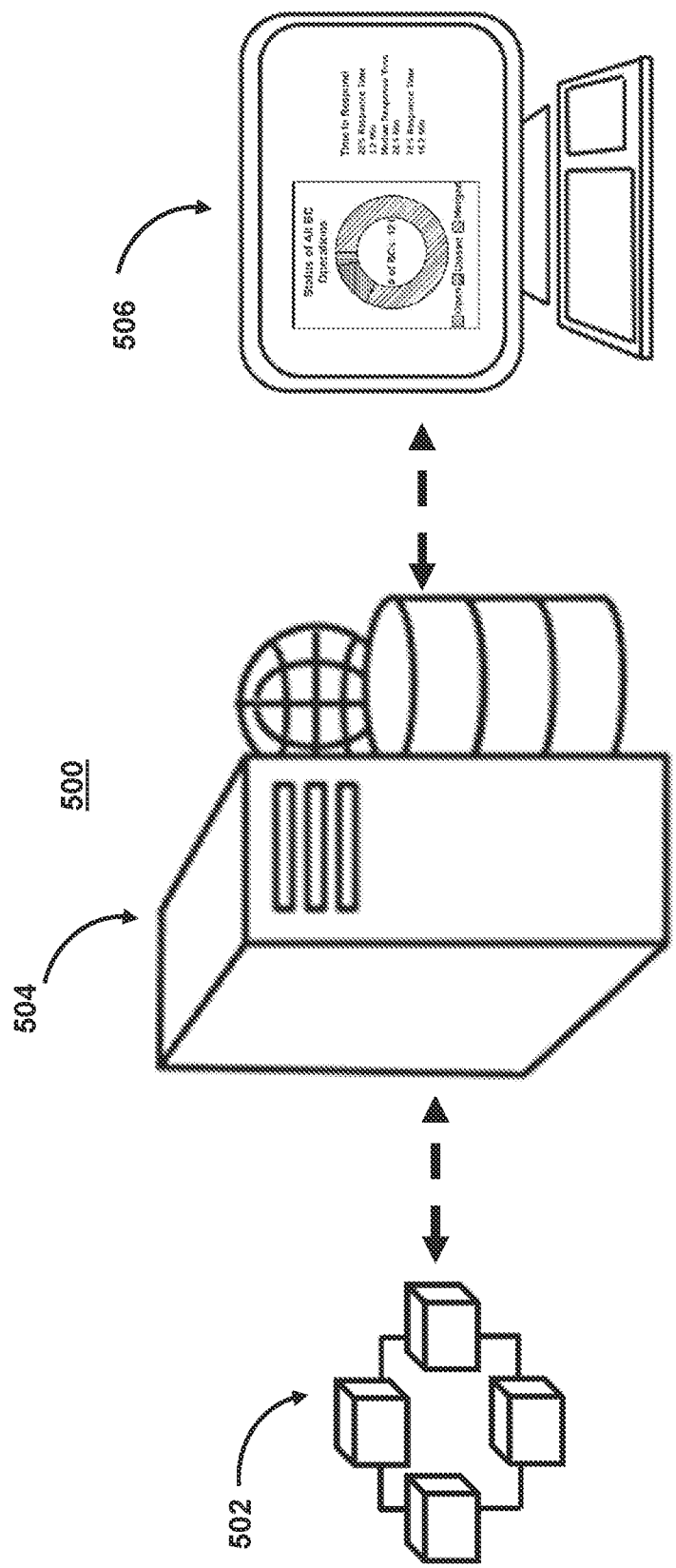
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to improve indexing, particularly improved indexing of non-standardized, custom smart contracts. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

In some embodiments, indexer 504 may record blockchain operations (e.g., transactions) related to non-standardized, custom smart contracts. For example, the custom smart contract may be smart contracts related to non-fungible tokens. For example, non-fungible tokens possess a specific digital signature that is contained within their smart contract. This identifying information is what makes each non-fungible token different from another, and hence, an individual cannot swap them for another token. In many cases, non-fungible tokens may be based on a given standard (e.g., ERC-721). The standard may indicate particular information that is included in the smart contract, where that information is located in bytecode, and/or other parameters, events, and characteristics of a non-fungible token, smart contract, and/or blockchain operation.

For example, non-fungible tokens corresponding to the ERC-721 standard may have a unit 256 variable called tokenId, so for any ERC-721 contract, the pair contract address, unit 256 tokenId are globally unique. This information may be used to produce an output (e.g., an image). For example, a dApp may have a "converter" that uses the tokenId as input and outputs an image or other content. In another example, ERC-20 is a standard interface for fungible (interchangeable) tokens, like voting tokens, staking tokens or virtual currencies. ERC-777 is a standard that allows people to build extra functionality on top of tokens such as a mixer contract for improved transaction privacy or an emergency recover function to bail you out if you lose your private keys. ERC-1155 is a standard that allows for more efficient trades and bundling of transactions—thus saving costs. This token standard allows for creating both utility tokens and non-fungible tokens.

In some embodiments, non-fungible tokens may not rely on a recognized and/or publicly verified standard. For example, a "custom" smart contract may comprise a smart contract that does not use one of the standards described in the aforementioned paragraph. In some embodiments, a "custom" smart contract may comprise a smart contract in which the contract code is not publicly verified contract code (e.g., available on the blockchain) and/or at a publicly available central repository (e.g., Etherscan). For example, the indexer may log the unique identifier that the network generates each time a blockchain operation is conducted. For example, the blockchain ID (e.g., transaction ID) may allow the system to track blockchain operations and to determine a status of a blockchain operation (e.g., whether or not it is confirmed or pending).

For example, the system may rely on information in a smart contract such as block height (e.g., a block number upon which a transaction is completed), timestamp (e.g., indicates the time at which the blockchain operation occurred), from/to address (e.g., an address of receiving or sending users), value (e.g., an amount sent, gas, and/or its equivalent US dollar value), and actual transaction fee or cost (e.g., the value or cost of a product in US dollars).

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
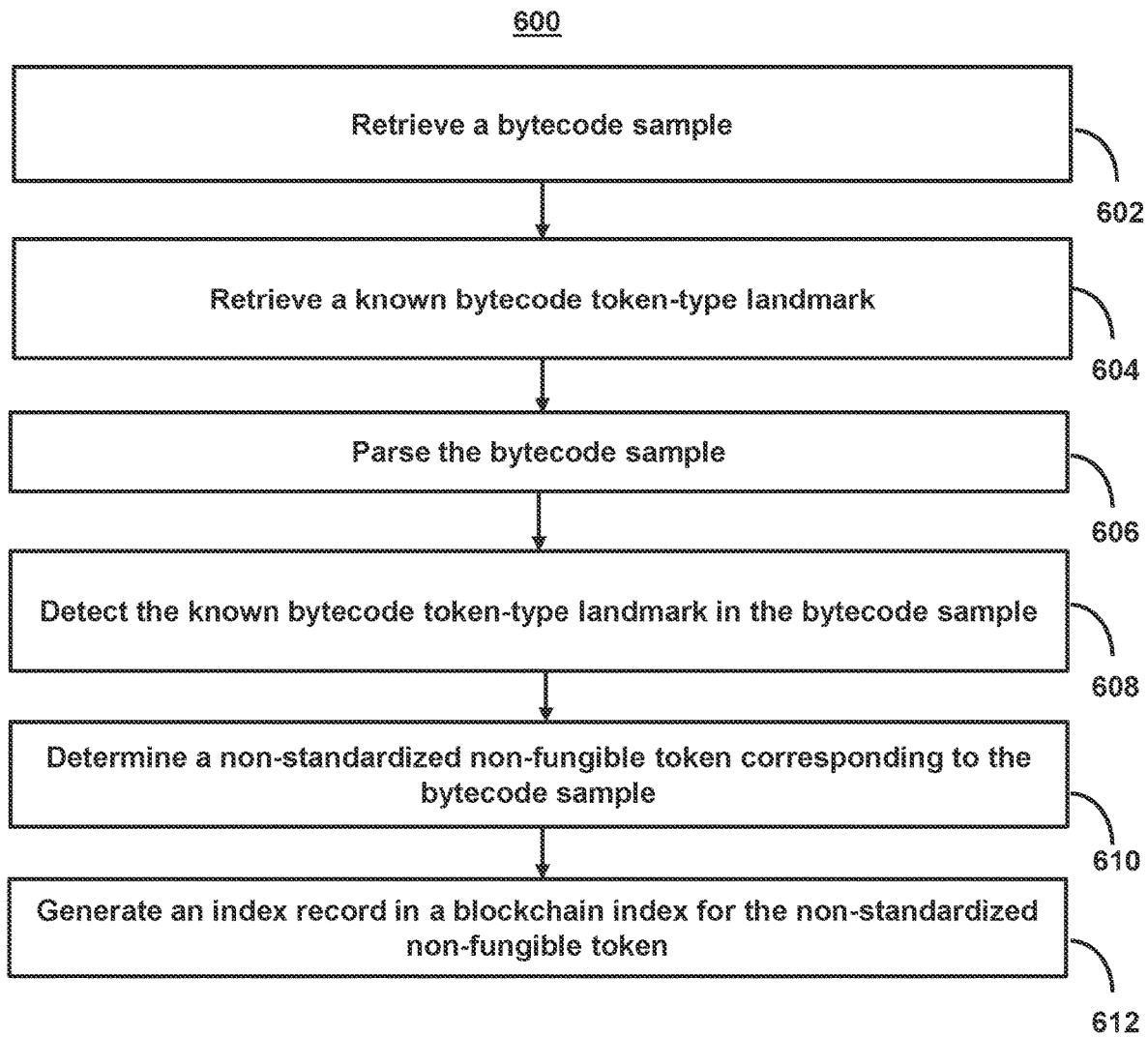
FIG. 6 shows a flowchart of the steps involved in of improved indexing of non-standardized, custom smart contracts, in accordance with one or more embodiments.

FIG. 6 shows a flowchart of the steps involved in improved indexing of non-standardized, custom smart contracts based on known landmarks in bytecode, in accordance with one or more embodiments. For example, the system may use process 600 (e.g., as implemented on one or more system components described above) in order to identify transactions for custom contracts in a reliable manner, but also identify attributes (e.g., parameters, events, etc.) in identified transactions. For example, the system may rely on information in a smart contract such as block height (e.g., a block number upon which a transaction is completed), timestamp (e.g., indicates the time at which the blockchain operation occurred), from/to address (e.g., an address of receiving or sending users), value (e.g., an amount sent, gas, and/or its equivalent US dollar value), and actual transaction fee or cost (e.g., the value or cost of a product in US dollars). In some embodiments, the system may detect the custom token-ness of a custom contract by matching the bytecode to known open-source data that is available.

At step 602, process 600 (e.g., using one or more components described above) retrieves a bytecode sample. For example, the system may retrieve, from a blockchain node, a first bytecode sample for a first blockchain operation. For example, the system may receive raw bytecode and/or blockchain data from a blockchain node. In some embodiments, the system may modify the frequency of this retrieval to minimize resource cost and/or gas fees.

At step 604, process 600 (e.g., using one or more components described above) retrieves a known bytecode token-type landmark. For example, the system may retrieve a known bytecode token-type landmark for a first non-standardized non-fungible token. For example, the system may maintain a database listing known bytecode samples for non-fungible token function standards to determine a plurality of known bytecode token-type landmarks. For example, token-type landmarks may comprise sequences of bytecode that act to identify a token type (e.g., a type a non-fungible token).

In some embodiments, the system may iteratively search blockchain operations for landmarks from a plurality of different non-standardized non-fungible tokens in order to determine which non-standardized non-fungible token the blockchain operation corresponds to. For example, the system may retrieve a plurality of non-standardized non-fungible tokens. The system may then determine a respective known bytecode token-type landmark for each of the plurality of non-standardized non-fungible tokens. The system may then parse the first bytecode sample for each respective known bytecode token-type landmark.

The system may likewise iteratively search blockchain operations for landmarks relating to different functions (e.g., corresponding to one or more non-standardized non-fungible tokens). For example, the system may input the first non-standardized non-fungible token into a database listing known bytecode samples for non-fungible token function standards to determine a plurality of known bytecode function-type landmarks for the first non-standardized non-fungible token. The system may do this in response to determining that the first blockchain operation corresponds to the first non-standardized non-fungible token. The system may then parse the first bytecode sample for each of the plurality of known bytecode function-type landmarks.

In some embodiments, the system may determine known landmarks based on previous action and/or through the use of machine learning models. For example, the system may determine if the known blockchain operations for a known non-fungible token has a given landmark. The system may search for the known landmark.

For example, the system may determine the known bytecode token-type landmark for the first non-standardized non-fungible token by retrieving, from the blockchain node, a second bytecode sample, wherein the second bytecode sample corresponds to a second blockchain operation, and wherein the second blockchain operation is known to correspond to the first non-standardized non-fungible token. The system may then retrieve, from the blockchain node, a third bytecode sample, wherein the third bytecode sample corresponds to a third blockchain operation, and wherein the third blockchain operation is known to correspond to the first non-standardized non-fungible token. The system may then compare the second bytecode sample and the third bytecode sample to determine the known bytecode token-type landmark. In some embodiments, comparing the second bytecode sample and the third bytecode sample to determine the known bytecode token-type landmark may further comprises matching text sequences in the second bytecode sample and the third bytecode sample.

At step 606, process 600 (e.g., using one or more components described above) parse the bytecode sample. For example, the system may parse the first bytecode sample for the known bytecode token-type landmark. For example, the system may parse the bytecode and perform one or more sequence matching and/or text searching algorithms to identity sequences of text in bytecode.

In some embodiments, parsing the first bytecode sample for the known bytecode token-type landmark may comprises parsing the first bytecode sample for the known bytecode token-type landmark with an artificial intelligence model trained to determining portions of bytecode samples that correspond to known bytecode token-type landmarks.

At step 608, process 600 (e.g., using one or more components described above) detects the known bytecode token-type landmark in the bytecode sample. For example, the system may determine that a portion of the first bytecode sample corresponds to the known bytecode token-type landmark. For example, the system may determine that a sequence of text within the bytecode sample matches (or is similar to) a known bytecode landmark. In some embodiments, the system may detect the custom token-ness of a custom contract by matching the bytecode to known open-source data that is available.

The system may detect a landmark based on detecting an exact match (e.g., a matching text string sequence), a probability of a match, and/or a portion of the bytecode has a threshold similarity. For example, the system may determine that the portion of the first bytecode sample corresponds to the known bytecode token-type landmark further comprises: determining a probability that the portion of the first bytecode sample corresponds to the known bytecode token-type landmark; and comparing the probability to a threshold probability to determine whether the probability equals or exceeds the threshold probability.

For example, parsing the first bytecode sample for the known bytecode token-type landmark further may comprises retrieving a similarity metric and determining whether portions of the first bytecode sample correspond to the known bytecode token-type landmark based on the similarity metric. The system may use various algorithms for determining a similarity metric. For example, the system may use edit distance-based algorithms that compute the number of operations needed to transform one string to another. For example, as the number of operations increases, the lower the similarity metric between the two strings. The system may further modify the importance of a given index character (e.g., based on the non-fungible token and/or characters determined to be of key importance).

Additionally, the system may determine a first similarity metric factor based on the first non-standardized non-fungible token and determine a second similarity metric factor based on the known bytecode token-type landmark. The system may then determine a similarity metric based on the first similarity metric factor and the second similarity metric factor. For example, a similarity metric factor may be any characteristic that distinguishes one factor from another. For example, a similarity metric factor may comprise a weight or importance of a character, text length, combination of characteristics, and/or combination of text strings.

At step 610, process 600 (e.g., using one or more components described above) determines a non-standardized non-fungible token corresponding to the bytecode sample. For example, the system may in response to determining that the portion of the first bytecode sample corresponds to the known bytecode token-type landmark, determine that the first blockchain operation corresponds to the first non-standardized non-fungible token. For example, the system may identify the non-standardized non-fungible token based on detecting the landmark. For example, the system may compare, validate, and/or group possible corresponding signatures with the known code.

At step 612, process 600 (e.g., using one or more components described above) generates an index record in a blockchain index for the non-standardized non-fungible token. For example, the system may in response to determining that the first blockchain operation corresponds to the first non-standardized non-fungible token, generate a first index record in a blockchain index for the first non-standardized non-fungible token, wherein the first index record corresponds to the first blockchain operation. For example, in response to determining that the blockchain operation corresponds to a non-standardized non-fungible token, the system may log the blockchain operation in a respective index.

In some embodiments, the system may continuously index blockchain operations corresponding to a given non-fungible token as the blockchain operations are detected. For example, the system may retrieve, from the blockchain node, a fourth bytecode sample for a fourth blockchain operation. The system may retrieve the known bytecode token-type landmark. The system may parse the fourth bytecode sample for the known bytecode token-type landmark. The system may determine that a portion of the fourth bytecode sample corresponds to the known bytecode token-type landmark. The system may, in response to determining that the portion of the fourth bytecode sample corresponds to the known bytecode token-type landmark, determine that the fourth blockchain operation corresponds to the first non-standardized non-fungible token. The system may, in response to determining that the first blockchain operation corresponds to the first non-standardized non-fungible token, generate a second index record in the blockchain index for the first non-standardized non-fungible token, wherein the second index record corresponds to the fourth blockchain operation, and wherein the blockchain index stores a temporal relationship between the first index record and the second index record.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: retrieving, from a blockchain node, a first bytecode sample for a first blockchain operation; retrieving a known bytecode token-type landmark for a first non-standardized non-fungible token; parsing the first bytecode sample for the known bytecode token-type landmark; determining that a portion of the first bytecode sample corresponds to the known bytecode token-type landmark; in response to determining that the portion of the first bytecode sample corresponds to the known bytecode token-type landmark, determining that the first blockchain operation corresponds to the first non-standardized non-fungible token; and in response to determining that the first blockchain operation corresponds to the first non-standardized non-fungible token, generating a first index record in a blockchain index for the first non-standardized non-fungible token, wherein the first index record corresponds to the first blockchain operation.

2. The method of the preceding embodiment wherein the method is for improved indexing of non-standardized, custom smart contracts based on known landmarks in bytecode.

3. The method of any one of the preceding embodiments, further comprising: retrieving a plurality of non-standardized non-fungible tokens; determining a respective known bytecode token-type landmark for each of the plurality of non-standardized non-fungible tokens; and parsing the first bytecode sample for each respective known bytecode token-type landmark.

4. The method of any one of the preceding embodiments, further comprising: in response to determining that the first blockchain operation corresponds to the first non-standardized non-fungible token, inputting the first non-standardized non-fungible token into a database listing known bytecode samples for non-fungible token function standards to determine a plurality of known bytecode function-type landmarks for the first non-standardized non-fungible token; and parsing the first bytecode sample for each of the plurality of known bytecode function-type landmarks.

5. The method of any one of the preceding embodiments, wherein determining that the portion of the first bytecode sample corresponds to the known bytecode token-type landmark further comprises: determining a probability that the portion of the first bytecode sample corresponds to the known bytecode token-type landmark; and comparing the probability to a threshold probability to determine whether the probability equals or exceeds the threshold probability.

6. The method of any one of the preceding embodiments, further comprising determining the known bytecode token-type landmark for the first non-standardized non-fungible token by: retrieving, from the blockchain node, a second bytecode sample, wherein the second bytecode sample corresponds to a second blockchain operation, and wherein the second blockchain operation is known to correspond to the first non-standardized non-fungible token; retrieving, from the blockchain node, a third bytecode sample, wherein the third bytecode sample corresponds to a third blockchain operation, and wherein the third blockchain operation is known to correspond to the first non-standardized non-fungible token; and comparing the second bytecode sample and the third bytecode sample to determine the known bytecode token-type landmark.

7. The method of any one of the preceding embodiments, wherein comparing the second bytecode sample and the third bytecode sample to determine the known bytecode token-type landmark further comprises matching text sequences in the second bytecode sample and the third bytecode sample.

8. The method of any one of the preceding embodiments, further comprising: retrieving, from the blockchain node, a fourth bytecode sample for a fourth blockchain operation; retrieving the known bytecode token-type landmark; parsing the fourth bytecode sample for the known bytecode token-type landmark; determining that a portion of the fourth bytecode sample corresponds to the known bytecode token-type landmark; in response to determining that the portion of the fourth bytecode sample corresponds to the known bytecode token-type landmark, determining that the fourth blockchain operation corresponds to the first non-standardized non-fungible token; and in response to determining that the first blockchain operation corresponds to the first non-standardized non-fungible token, generating a second index record in the blockchain index for the first non-standardized non-fungible token, wherein the second index record corresponds to the fourth blockchain operation, and wherein the blockchain index stores a temporal relationship between the first index record and the second index record.

9. The method of any one of the preceding embodiments, wherein parsing the first bytecode sample for the known bytecode token-type landmark comprises parsing the first bytecode sample for the known bytecode token-type landmark with an artificial intelligence model trained to determining portions of bytecode samples that correspond to known bytecode token-type landmarks.

10. The method of any one of the preceding embodiments, wherein parsing the first bytecode sample for the known bytecode token-type landmark further comprises: retrieving a similarity metric; determining whether portions of the first bytecode sample correspond to the known bytecode token-type landmark based on the similarity metric.

11. The method of any one of the preceding embodiments, further comprising: determining a first similarity metric factor based on the first non-standardized non-fungible token; determining a second similarity metric factor based on the known bytecode token-type landmark; and determining the similarity metric based on the first similarity metric factor and the second similarity metric factor.

12. A tangible, non-transitory, machine-readable medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system for improved indexing of non-standardized, custom smart contracts based on known landmarks in blockchain bytecode, the system comprising:
one or more processors; and
memory instructions recorded thereon that, when executed by the one or more processors, cause operations comprising:
retrieving, from a blockchain node, a first bytecode sample for a first blockchain operation;
retrieving a known bytecode token-type landmark for a first non-standardized non-fungible token;
parsing the first bytecode sample for the known bytecode token-type landmark;
determining that a portion of the first bytecode sample corresponds to the known bytecode token-type landmark;
in response to determining that the portion of the first bytecode sample corresponds to the known bytecode token-type landmark, determining that the first blockchain operation corresponds to the first non-standardized non-fungible token, wherein determining that the portion of the first bytecode sample corresponds to the known bytecode token-type landmark comprises:
determining a probability that the portion of the first bytecode sample corresponds to the known bytecode token-type landmark; and
comparing the probability to a threshold probability to determine whether the probability equals or exceeds the threshold probability; and
in response to determining that the first blockchain operation corresponds to the first non-standardized non-fungible token, generating a first index record in a blockchain index for the first non-standardized non-fungible token, wherein the first index record corresponds to the first blockchain operation.

2. A method for improved indexing of non-standardized, custom smart contracts based on known landmarks in bytecode, the method comprising:
  retrieving, from a blockchain node, a first bytecode sample for a first blockchain operation;
  retrieving a known bytecode token-type landmark for a first non-standardized non-fungible token;
  parsing the first bytecode sample for the known bytecode token-type landmark, wherein parsing the first bytecode sample for the known bytecode token-type landmark further comprises:
    retrieving a similarity metric; and
    determining whether portions of the first bytecode sample correspond to the known bytecode token-type landmark based on the similarity metric;
  determining that a portion of the first bytecode sample corresponds to the known bytecode token-type landmark;
  in response to determining that the portion of the first bytecode sample corresponds to the known bytecode token-type landmark, determining that the first blockchain operation corresponds to the first non-standardized non-fungible token; and
  in response to determining that the first blockchain operation corresponds to the first non-standardized non-fungible token, generating a first index record in a blockchain index for the first non-standardized non-fungible token, wherein the first index record corresponds to the first blockchain operation.

3. The method of claim 2, further comprising:
  retrieving a plurality of non-standardized non-fungible tokens;
  determining a respective known bytecode token-type landmark for each of the plurality of non-standardized non-fungible tokens; and
  parsing the first bytecode sample for each respective known bytecode token-type landmark.

4. The method of claim 2, further comprising:
  in response to determining that the first blockchain operation corresponds to the first non-standardized non-fungible token, inputting the first non-standardized non-fungible token into a database listing known bytecode samples for non-fungible token function standards to determine a plurality of known bytecode function-type landmarks for the first non-standardized non-fungible token; and
  parsing the first bytecode sample for each of the plurality of known bytecode function-type landmarks.

5. The method of claim 2, wherein determining that the portion of the first bytecode sample corresponds to the known bytecode token-type landmark further comprises:
  determining a probability that the portion of the first bytecode sample corresponds to the known bytecode token-type landmark; and
  comparing the probability to a threshold probability to determine whether the probability equals or exceeds the threshold probability.

6. The method of claim 2, further comprising determining the known bytecode token-type landmark for the first non-standardized non-fungible token by:
  retrieving, from the blockchain node, a second bytecode sample, wherein the second bytecode sample corresponds to a second blockchain operation, and wherein the second blockchain operation is known to correspond to the first non-standardized non-fungible token;
  retrieving, from the blockchain node, a third bytecode sample, wherein the third bytecode sample corresponds to a third blockchain operation, and wherein the third blockchain operation is known to correspond to the first non-standardized non-fungible token; and
  comparing the second bytecode sample and the third bytecode sample to determine the known bytecode token-type landmark.

7. The method of claim 6, wherein comparing the second bytecode sample and the third bytecode sample to determine the known bytecode token-type landmark further comprises matching text sequences in the second bytecode sample and the third bytecode sample.

8. The method of claim 2, further comprising:
  retrieving, from the blockchain node, a fourth bytecode sample for a fourth blockchain operation;
  retrieving the known bytecode token-type landmark;
  parsing the fourth bytecode sample for the known bytecode token-type landmark;
  determining that a portion of the fourth bytecode sample corresponds to the known bytecode token-type landmark;
  in response to determining that the portion of the fourth bytecode sample corresponds to the known bytecode token-type landmark, determining that the fourth blockchain operation corresponds to the first non-standardized non-fungible token; and
  in response to determining that the first blockchain operation corresponds to the first non-standardized non-fungible token, generating a second index record in the blockchain index for the first non-standardized non-fungible token, wherein the second index record corresponds to the fourth blockchain operation, and wherein the blockchain index stores a temporal relationship between the first index record and the second index record.

9. The method of claim 2, wherein parsing the first bytecode sample for the known bytecode token-type landmark comprises parsing the first bytecode sample for the known bytecode token-type landmark with an artificial intelligence model trained to determining portions of bytecode samples that correspond to known bytecode token-type landmarks.

10. The method of claim 2, further comprising:
  determining a first similarity metric factor based on the first non-standardized non-fungible token;
  determining a second similarity metric factor based on the known bytecode token-type landmark; and
  determining the similarity metric based on the first similarity metric factor and the second similarity metric factor.

11. One or more non-transitory, computer-readable media comprising instructions that, when executed by one or more processors, cause operations comprising:
  retrieving, from a blockchain node, a first bytecode sample for a first blockchain operation;
  retrieving a known bytecode token-type landmark for a first non-standardized non-fungible token;
  parsing the first bytecode sample for the known bytecode token-type landmark, wherein parsing the first bytecode sample for the known bytecode token-type landmark comprises parsing the first bytecode sample for the known bytecode token-type landmark with an artificial intelligence model trained to determining portions of bytecode samples that correspond to known bytecode token-type landmarks;
  determining that a portion of the first bytecode sample corresponds to the known bytecode token-type landmark;

in response to determining that the portion of the first bytecode sample corresponds to the known bytecode token-type landmark, determining that the first blockchain operation corresponds to the first non-standardized non-fungible token; and in response to determining that the first blockchain operation corresponds to the first non-standardized non-fungible token, generating a first index record in a blockchain index for the first non-standardized non-fungible token, wherein the first index record corresponds to the first blockchain operation.

12. The one or more non-transitory, computer-readable media of claim 11, further comprising:

retrieving a plurality of non-standardized non-fungible tokens;

determining a respective known bytecode token-type landmark for each of the plurality of non-standardized non-fungible tokens; and parsing the first bytecode sample for each respective known bytecode token-type landmark.

13. The one or more non-transitory, computer-readable media of claim 11, further comprising:

in response to determining that the first blockchain operation corresponds to the first non-standardized non-fungible token, inputting the first non-standardized non-fungible token into a database listing known bytecode samples for non-fungible token function standards to determine a plurality of known bytecode function-type landmarks for the first non-standardized non-fungible token; and parsing the first bytecode sample for each of the plurality of known bytecode function-type landmarks.

14. The one or more non-transitory, computer-readable media of claim 11, wherein determining that the portion of the first bytecode sample corresponds to the known bytecode token-type landmark further comprises:

determining a probability that the portion of the first bytecode sample corresponds to the known bytecode token-type landmark; and comparing the probability to a threshold probability to determine whether the probability equals or exceeds the threshold probability.

15. The one or more non-transitory, computer-readable media of claim 11, further comprising determining the known bytecode token-type landmark for the first non-standardized non-fungible token by:

retrieving, from the blockchain node, a second bytecode sample, wherein the second bytecode sample corresponds to a second blockchain operation, and wherein the second blockchain operation is known to correspond to the first non-standardized non-fungible token;

retrieving, from the blockchain node, a third bytecode sample, wherein the third bytecode sample corresponds to a third blockchain operation, and wherein the third blockchain operation is known to correspond to the first non-standardized non-fungible token; and comparing the second bytecode sample and the third bytecode sample to determine the known bytecode token-type landmark.

16. The one or more non-transitory, computer-readable media of claim 15, wherein comparing the second bytecode sample and the third bytecode sample to determine the known bytecode token-type landmark further comprises matching text sequences in the second bytecode sample and the third bytecode sample.

17. The one or more non-transitory, computer-readable media of claim 11, the operations further comprising:

retrieving, from the blockchain node, a fourth bytecode sample for a fourth blockchain operation;

retrieving the known bytecode token-type landmark;

parsing the fourth bytecode sample for the known bytecode token-type landmark;

determining that a portion of the fourth bytecode sample corresponds to the known bytecode token-type landmark;

in response to determining that the portion of the fourth bytecode sample corresponds to the known bytecode token-type landmark, determining that the fourth blockchain operation corresponds to the first non-standardized non-fungible token; and in response to determining that the first blockchain operation corresponds to the first non-standardized non-fungible token, generating a second index record in the blockchain index for the first non-standardized non-fungible token, wherein the second index record corresponds to the fourth blockchain operation, and wherein the blockchain index stores a temporal relationship between the first index record and the second index record.

18. The one or more non-transitory, computer-readable media of claim 11, wherein parsing the first bytecode sample for the known bytecode token-type landmark further comprises:

determining a first similarity metric factor based on the first non-standardized non-fungible token;

determining a second similarity metric factor based on the known bytecode token-type landmark;

determining a similarity metric based on the first similarity metric factor and the second similarity metric factor; and determining whether portions of the first bytecode sample correspond to the known bytecode token-type landmark based on the similarity metric.

\* \* \* \* \*